C. AALBORG AND A. H. BAKKEN.
CIRCUIT INTERRUPTER.
APPLICATION FILED OCT. 8, 1919.

1,437,079.

Patented Nov. 28, 1922.
4 SHEETS—SHEET 1.

WITNESSES:

INVENTORS
Christian Aalborg &
Andrew H. Bakken
BY
ATTORNEY

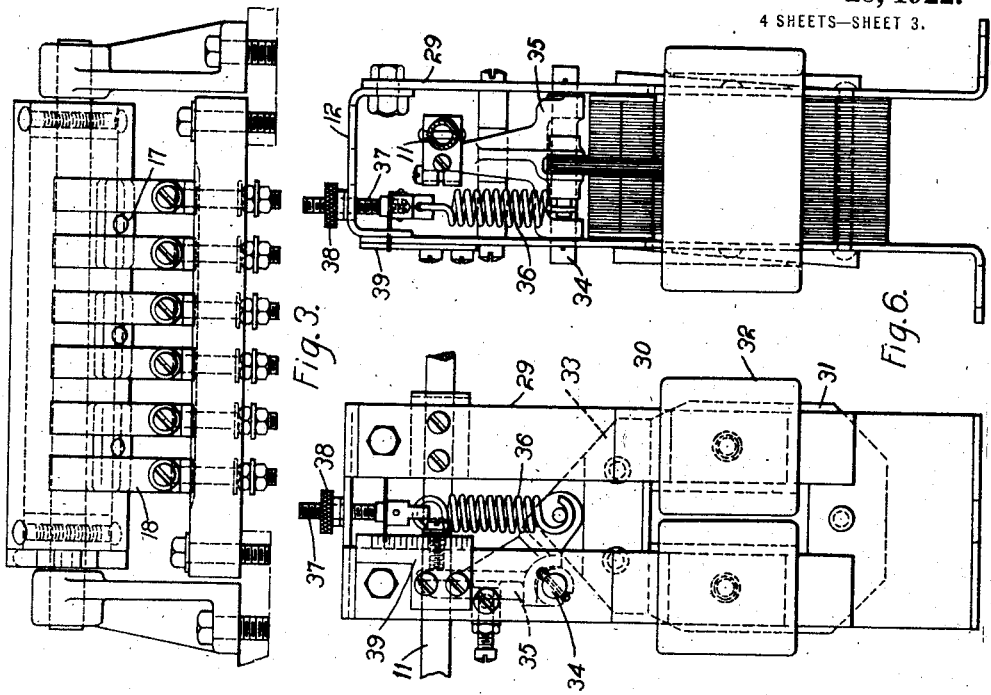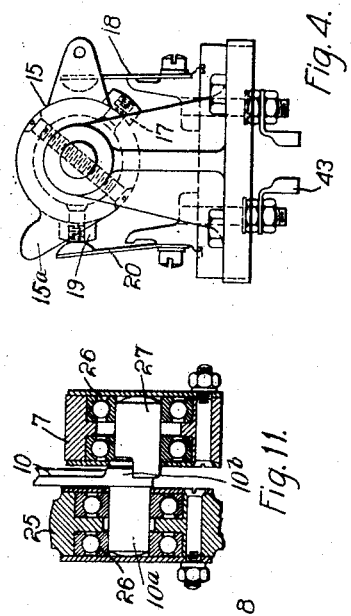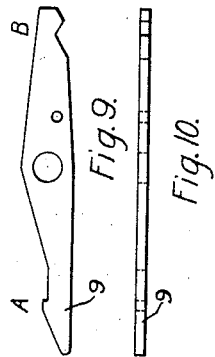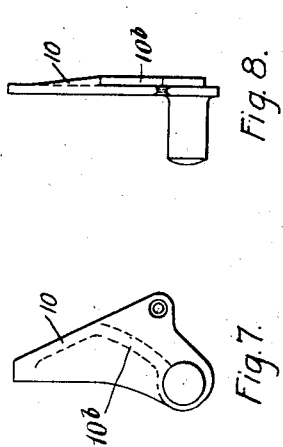

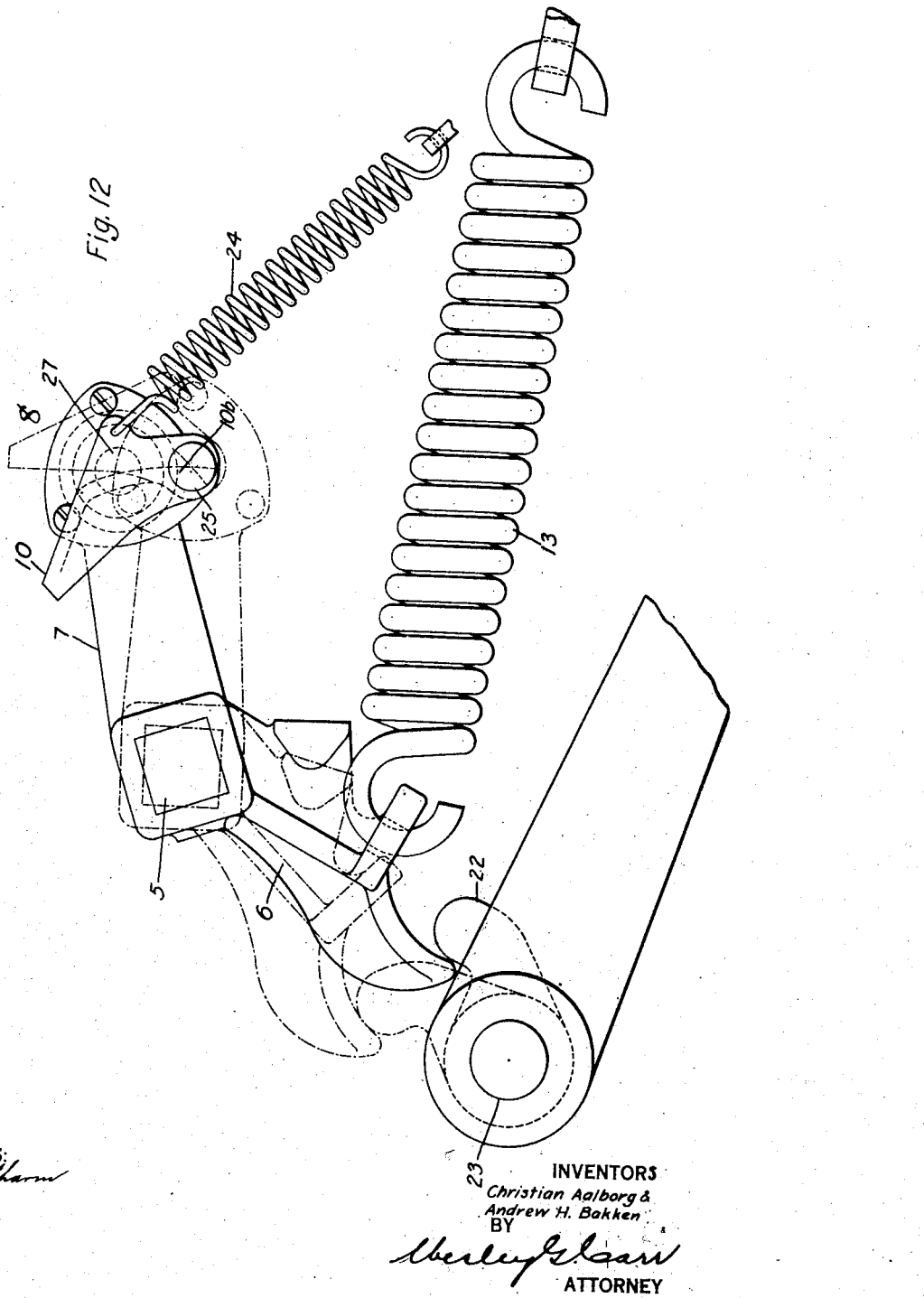

Patented Nov. 28, 1922.

1,437,079

UNITED STATES PATENT OFFICE.

CHRISTIAN AALBORG, OF PITTSBURGH, AND ANDREW H. BAKKEN, OF EDGEWOOD PARK, PENNSYLVANIA, ASSIGNORS TO WESTINGHOUSE ELECTRIC & MANUFACTURING COMPANY, A CORPORATION OF PENNSYLVANIA.

CIRCUIT INTERRUPTER.

Application filed October 8, 1919. Serial No. 329,204.

*To all whom it may concern:*

Be it known that we, CHRISTIAN AALBORG, a citizen of the United States, and a resident of Pittsburgh, in the county of Allegheny and State of Pennsylvania, and ANDREW H. BAKKEN, a citizen of the United States, and a resident of Edgewood Park, in the county of Allegheny and State of Pennsylvania, have invented a new and useful Improvement in Circuit Interrupters, of which the following is a specification.

Our invention relates to circuit interrupters and particularly to quick-acting circuit interrupters.

One object of our invention is to provide a quick-acting circuit interrupter for short-circuiting the windings in the armature of an electric generator upon an occurence of a heavy short-circuit in the main circuit being supplied by the generator.

Another object of our invention is to provide a device that shall trip all the circuit interrupters connected to the generator simultaneously with the short-circuiting of the armature windings of the generator.

A further object of our invention is to provide a circuit interrupter that shall be simple and rugged in construction, but sensitive and reliable in operation.

In practicing our invention, we provide a plurality of switch blades and switch jaws that are connected to the windings of a generator armature and are adapted to short-circuit such windings, a latching mechanism for preventing the switch blades from engaging the switch jaws, a latching member for engaging and holding said latching mechanism, a plurality of tripping mechanisms for releasing said latching mechanism by actuating a rod adapted to actuate said latching member and two springs for effecting an engagement of the switch blades and the switch jaws.

We provide, further, an auxiliary interlocking switch, comprising a plurality of resiliently mounted fingers and a drum having two sets of contacts mounted thereon, of which, one set is adapted, in the normal position of the circuit interrupter, to complete control circuits to various circuit interrupters in the generator system and the other set to complete various tripping circuits to said generator circuit interrupters when the circuit interrupter has been actuated to short-circuit the generator-armature windings.

We provide, still further, a mechanism for resetting the circuit interrupter after it has been actuated to short-circuit the windings of the generator armature.

Figure 1:
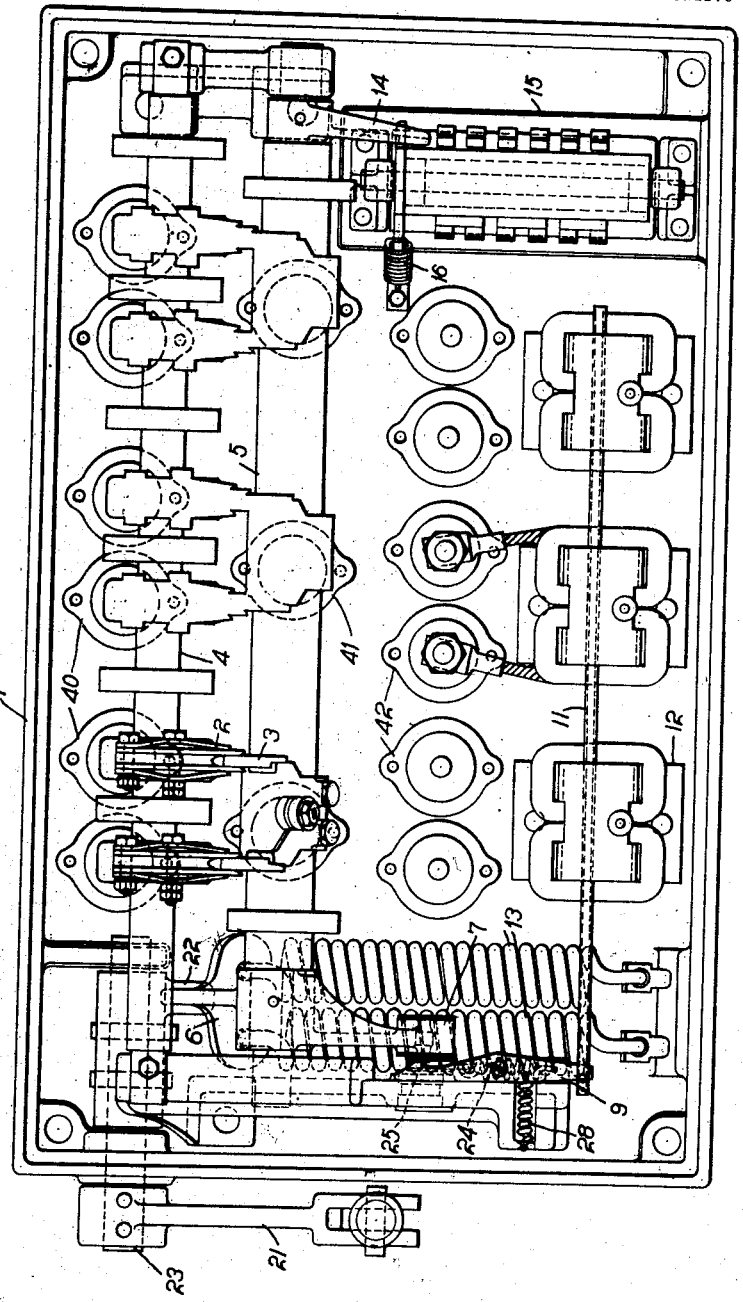
Figure 2:
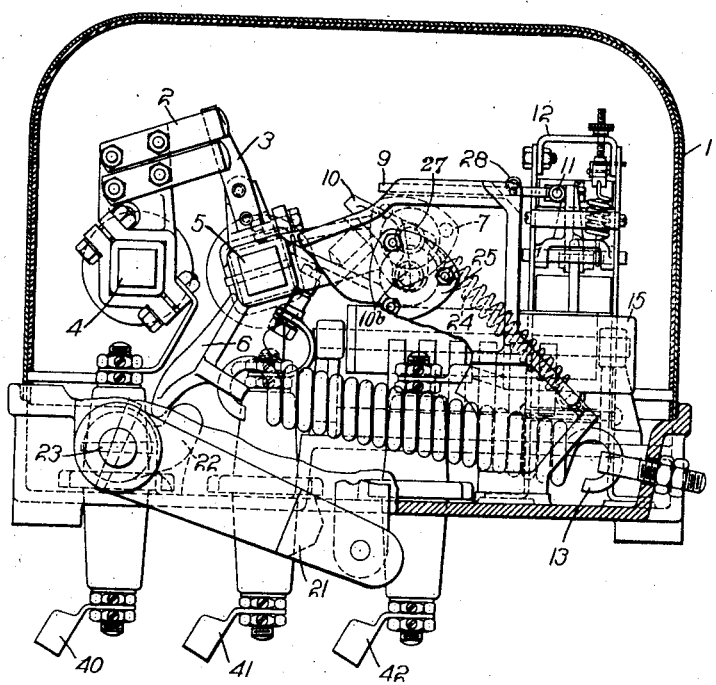

In the accompanying drawings, Figure 1 is a plan view of a circuit interrupter embodying our invention; Fig. 2 is a side view, partly in section and partly in elevation, of the circuit interrupter; Figs. 3 and 4 are a front and an end view, respectively, of the auxiliary interlocking switch; Figs. 5 and 6 are a front and a side view respectively, of a tripping mechanism; Figs. 7 and 8 are a front and a side view, respectively, of the latch; Figs. 9 and 10 are a plan and an edge view of the latching member, Fig. 11 is a view of the latching mechanism in locked position, and Fig. 12 is a detail view showing, in full lines, the position of the latching apparatus when the switch is closed, and, in dotted lines, the position of such apparatus when the switch is open.

In a circuit interrupter 1 a plurality of switch jaws 2 and switch blades 3 are fixedly mounted on a bar 4 and a shaft 5, respectively. The bar 4 is fixedly mounted and the shaft 5 is mounted to permit a turning movement. The shaft 5 has also fixedly mounted on it, an arm member 6 of a movable member 7 that forms part of a latching mechanism 8. A latching member 9 normally holds an arm 10 of the latching mechanism 8 in its latched position. The arm 10 holds the movable member 7 of the latching mechanism 8, in a manner to be hereinafter described, and precludes a turning movement of the shaft 5 and the consequent engagement of the switch blades 3 with the switch jaws 2. A rod 11 (Figs. 1 and 5) which may be actuated by any one of a plurality of tripping mechanisms 12, actuates the latching member 9, thereby releasing the arm 10 of the latching mechanism 8.

The movable member 7 is now free to move, and two springs 13, acting on the arm member 6, turn the shaft 5 and consummate an engagement of the switch jaws 2 and switch blades 3. Simultaneously, a cam member 14, which is fixedly mounted on the shaft 5, is disengaged from a shoulder 15ᵃ of the movable contact carrier of an interlocking switch 15 and permits a spring 16 to turn the switch 15 from the position wherein an engagement is effected between one set of contact members 17 and a set of fingers 18, to another position wherein an engagement is effected between another set of contact members 19 and another set of fingers 20, as illustrated in Figs. 3 and 4.

A bell-crank 21 and a cam member 22 are so fixedly mounted on a shaft 23 that an actuation of the bell-crank 21 will cause the cam member 22 to engage the arm member 6 and turn the shaft 5, on which the arm member 6 is fixedly mounted, until the movable member 7 of the latching mechanism 8 is re-latched by the arm 10 and the latching member 9. A spring 24 returns the latch arm 10 to its latching position as the latching mechanism 8 is reset. The two springs 13 are now put in tension and are ready to actuate the circuit-interrupter upon the release of the latching mechanism 8.

The latching mechanism 8, as illustrated in Figs. 11 and 12, comprises the movable member 7, and a stationary member 25, of which, each member has a ball-bearing race 26 mounted therein. A lateral projection 10$^a$ on the toe of the arm 10 is pivotally supported in the race 26 of the stationary member 25 to permit an angular movement of the arm 10 in its own plane. A latch 27 is pivotally supported in the race 26 of the movable member 7, as illustrated in Fig. 11, and is precluded, by a cam portion 10$^b$ on the arm 10, from turning. The movable member 7, is thus precluded, from moving upwards to permit the actuation of the circuit-interrupter 1. The latching member 9, which is illustrated in Fig. 9, is pivotally mounted at its center and, normally, engages and holds the arm 10, at one end A. A tension spring 28, mounted between the structure of the circuit interrupter and the latching member 9, imparts a more positive hold on the arm 10. The other end B of the latching member 9, is actuated by the rod 11, to effect the release of the arm 9. Upon movement of the latching member 9 by the tripping mechanism 12, the arm 10 is released and the tension of the springs 13, acting through the lever 6—7 and the latch 27 carried thereby, overcomes the tension of the spring 24 and carries the latch 27 along the camming surface 10$^b$ of the arm 10, from the position shown in Fig. 11 to the position shown in full lines in Fig. 12 and in dotted lines in Fig. 2, in which position the contact members 2 and 3 are closed.

To reset the movable contact members 3 in open position, the crank 21 is turned in a counter-clockwise direction on its shaft 23, bringing the cam member 22 into engagement with the arm 6 of the movable member 7 to return it, against the tension of the springs 13, to the position indicated in dotted lines in Fig. 12. During this movement, the shouldered portion of the latch 27 slides downwardly along the camming surface 10$^b$ of the arm 10 until it comes opposite the projection 10$^a$. The spring 24 will then return the latch 10 to the position indicated in dotted lines in Fig. 12, and the end of the arm 10 will snap into position in notch A of the latching member 9. The crank 21 may then be released, as the latched engagement of the member 9 with the arm 10 will maintain the camming surface 10$^b$ in the path of the latch 27, as shown in Fig. 11, and prevent movement of the arm 10, under the action of the springs 13, until the member 9 is again released to permit movement of the arm 10.

A tripping mechanism 12, which is illustrated in Figs. 5 and 6, comprises a frame 29, having mounted thereon, an electro-magnet 30, comprising a laminated iron core 31 and a surrounding coil 32, an armature 33 to be attracted to the core 31 through the magnetic action of the current traversing the coil 32, a shaft 34 upon which is pivotally mounted a bell-crank 35, of which one end is pivotally mounted on the armature 33 and the other end similarly mounted on the tripping rod 11. A spring 36, having one end mounted on the armature 33 and the other end on a set screw 37, may be so adjusted by a nut 38 on the screw 37, that the magnetic force required to actuate the rod 11 will be relatively varied in accordance with a scale 39 mounted on the frame 29. When the coils 32 are sufficiently energized to attract the armature 33, thereby moving the rod 11, the latching member 9 is released and the circuit-interrupter 1 actuated. Terminals 40 are for connecting external conductors to the switch jaws 2, terminals 41 for connecting conductors to the switch blades 3, terminals 42 for connecting conductors to the coils 32 mounted on the tripping mechanisms 12 and terminals 43 for connecting conductors to the fingers 18 and 20 on the interlocking switch 15.

Although the structure embodying our invention is shown in the preferred form, we do not limit our invention to this structure, as various modifications may be made without departing from the spirit and scope of the appended claims.

We claim, as our invention:

1. In a quick-acting circuit-interrupter, the combination with a plurality of contact members, of a bar and a shaft having stationary and movable contact members respectively mounted thereon, the bar being fixedly mounted and the shaft being disposed as a pivot for the movable contact members and for a latching mechanism, a bell-crank having means for dis-engaging the movable contact members from the stationary contact members and for re-setting the latching mechanism, a latching member adapted to hold the latching mechanism, a rod for actuating the latching member, a plurality of electro-magnets for actuating the rod to actuate the latching member and release the latching mechanism, and a plurality of springs for actuating the movable contact members upon the releasing of the latching mechanism.

2. In a quick-acting circuit interrupter, the combinaion with a fixed bar having a plurality of contact members mounted thereon, of a shaft also having a plurality of contact members mounted thereon, the shaft serving as a pivotal support for the contact members mounted thereon, for a latching mechanism and for a cam member, the latching mechanism being adapted to maintain the circuit interrupter open until the latching mechanism is released, a latching member adapted to hold the latching mechanism, a rod for actuating the latching member, a plurality of bell cranks for actuating the rod, means for operating the bell cranks to actuate the rod for releasing the latching mechanism, springs for suddenly actuating the circuit interrupter upon the release of the latching mechanism, a bell crank for actuating a cam member adapted to actuate the shaft by means of a cam member pivotally disposed on the shaft to re-set the circuit interrupter, a spring attached to the latching mechanism disposed to return the latching mechanism to its initial position upon the re-setting of the circuit interrupter, and an auxiliary interlocking switch actuated by a spring and by a cam member on the shaft.

3. In a circuit interrupter, the combination with a plurality of relatively movable contact members, of a drum controller also provided with contact members, a latching mechanism adapted to lock the first-named contact members in open position, a yieldingly actuated closing mechanism, means for releasing the latching mechanism, and a connection between the closing mechanism and the said controller whereby the controller is actuated by the movement of the closing mechanism.

4. In a circuit interrupter, the combination with a plurality of relatively movable contact members, of a drum controller also provided with contact members, a latching mechanism adapted to lock the first-named contact members in open position, a yieldingly actuated closing mechanism, means for releasing the latching mechanism, means for automatically resetting the latching mechanism when the said contact members are returned to open position, and a connection between the closing mechanism and the said controller whereby the controller is actuated by the movement of the closing mechanism.

5. The combination with a switching mechanism, of stationary contact members, movable contact members, a lever for carrying the movable contact members, a rotatable shaft on which said lever is fixedly mounted, a control switch located adjacent to the shaft, means for yieldingly maintaining the control switch in one position, and an arm carried by the shaft and adapted to move the control switch against the yielding means when the shaft is rotated to change the relative positions of the contact members.

6. The combination with a switching mechanism, of stationary contact members, movable contact members, a lever for carrying the movable contact members, a rotatable shaft on which said lever is fixedly mounted, means for normally yieldingly maintaining the movable contact-carrying lever in one position, a latching mechanism adapted to lock said lever in the opposite position, means for automatically tripping the latching mechanism under predetermined conditions in an electric circuit, means for returning the contact-carrying lever to said opposite position, means for automatically resetting the latching mechanism, a control switch, means for yieldingly maintaining the control switch in one position, and an arm carried by the shaft and adapted to move the control switch against the yielding means when the shaft is rotated to change the relative positions of the contact members.

7. In combination, in switching apparatus, a tripping device actuated by variations in an electrical circuit, a main switch adapted to be actuated by the tripping device, a drum controller normally yieldingly held in one position, and a lost-motion connection between the main switch and the drum controller whereby, when the switch is caused to move in one direction, the controller will be moved against the yielding means and, when the main switch is caused to move in the opposite direction, will permit the controller to return to normal position.

In testimony whereof, we have hereunto subscribed our names this 18th day of Sept., 1919.

CHRISTIAN AALBORG.
ANDREW H. BAKKEN.